(12) United States Patent
Law et al.

(10) Patent No.: US 8,151,209 B2
(45) Date of Patent: Apr. 3, 2012

(54) USER INPUT FOR AN ELECTRONIC DEVICE EMPLOYING A TOUCH-SENSOR

(75) Inventors: Ho Kee (Herbert) Law, Santa Clara, CA (US); Sheng Dong, Fremont, CA (US); Amal Prabhu, Santa Clara, CA (US); Toshiki Kikuchi, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2296 days.

(21) Appl. No.: 10/830,926

(22) Filed: Apr. 23, 2004

(65) Prior Publication Data

US 2005/0240879 A1 Oct. 27, 2005

(51) Int. Cl.
*G06F 3/048* (2006.01)
(52) U.S. Cl. .......... 715/773; 715/800; 715/771
(58) Field of Classification Search .......... 715/800, 715/771–773
See application file for complete search history.

(56) References Cited

U.S. PATENT DOCUMENTS

| | | | | |
|---|---|---|---|---|
| 5,917,476 | A | 6/1999 | Czerniecki | 345/173 |
| 6,011,542 | A | 1/2000 | Durrani et al. | 345/156 |
| 6,163,313 | A | 12/2000 | Aroyan et al. | 345/173 |
| 6,492,979 | B1 | 12/2002 | Kent et al. | 345/173 |
| 6,501,529 | B1 | 12/2002 | Kuriara et al. | 349/160 |
| 6,556,222 | B1 | 4/2003 | Narayanaswami | 345/786 |
| 2002/0122031 | A1* | 9/2002 | Maglio et al. | 345/184 |
| 2003/0048262 | A1 | 3/2003 | Wu et al. | 345/173 |
| 2003/0197736 | A1* | 10/2003 | Murphy | 345/780 |
| 2004/0104896 | A1* | 6/2004 | Suraqui | 345/168 |

* cited by examiner

*Primary Examiner* — Simon Ke
(74) *Attorney, Agent, or Firm* — Mayer & Williams PC; Stuart H. Mayer, Esq.; Karin L. Williams, Esq.

(57) ABSTRACT

A graphical text entry system for an electronic device is provided. The electronic device may be, for example, a portable or hand-held electronic device such as a cellular telephone, PDA, or the like. The system includes a graphical text entry screen and a graphical text entry ring displayed on the graphical text entry screen. A plurality of characters such as letters or numbers is positioned on the graphical text entry ring. The system also includes a touch sensor ring located on the graphical text entry screen for selecting individual characters from among the plurality of characters located on the text entry ring.

45 Claims, 8 Drawing Sheets

USER INPUT FOR AN ELECTRONIC DEVICE EMPLOYING A TOUCH-SENSOR

FIELD OF INVENTION

The present invention relates in general to the field of data input devices, and particularly to a character input interface for compact or hand held electronic devices requiring alphanumeric inputs from the user.

BACKGROUND OF INVENTION

As electronic devices, such as personal digital assistants (PDAs), cellular phones and other hand held electronic devices continue to decrease in size, proper design of the input interface for these devices becomes more important. As the space required for implementing the input interface becomes increasingly more limited, an improper design of this interface may render the electronic devices cumbersome, slow, or even unusable. For example, too many buttons on the interface may disorient an unsophisticated user. Too few keys may require that the available buttons be assigned secondary or even tertiary functions, greatly increasing the number of keystrokes and time required for even simple entries. A cumbersome layout would render the data entry slow and tedious, while tiny keys or buttons would be difficult to see and manipulate and, in addition, would require extreme precision on the part of the user.

Current hand held electronic devices have mitigated these problems by incorporating a scheme that allows menu and other selections to be made by touching sensitive areas of the screen. In addition, many devices allow alphanumeric character input by means of a stylus that is used to "write" on a touch-sensitive portion of the screen. The electronic device is then capable of translating the handwriting using a simplified handwriting-recognition algorithm. While this method is improved, it is still necessary for the user to use two hands to enter the data, one hand to hold the apparatus and one hand to write on the screen. Additionally, the apparatus must interpret the handwriting into a computer readable format, and the procedure for doing so is time consuming and is also less than 100% accurate. Furthermore, the variety of characters that may be entered may be limited based on the ability of the apparatus to discern between various handwritten material.

Other hand held electronic devices allow the user to input data while still maintaining a reduced overall size by providing a keyboard for data entry, which is implemented as a graphic on a liquid crystal display (LCD). Thus, the LCD displays a keyboard, such as would be available in a regular computer or typewriter, and the user touches each of the LCD-displayed keys to enter data. However, even these keyboards may be insufficient, since if the apparatus is small enough, the keyboard keys are so small so as to be difficult to use by the user. Additionally, if the graphical display is too small, such a keyboard will not function properly.

The aforementioned interfaces, while functional, do not represent an optimal solution that adequately addresses the rapid input of alphanumeric and other data input in some electronic devices.

Accordingly, the need for such an input interface has heretofore remained unsatisfied.

SUMMARY OF THE INVENTION

In accordance with the present invention, a graphical text entry system is provided. The system includes a graphical text entry screen, a graphical text entry ring displayed on the graphical text entry screen, and a plurality of characters positioned on the graphical text entry ring. The system also includes a touch sensor ring located on the graphical text entry screen for selecting individual characters from among the plurality of characters on the text entry ring.

In accordance with one aspect of the invention, the text entry ring has a plurality of angular text entry segments extending along its circumference in each of which one of the characters is located. The touch sensor ring has a plurality of angular touch sensor segments located along its circumference such that each of the touch sensor segments occupies an angular position along the touch sensor ring that corresponds to an angular position occupied by one of the text entry segments along the text entry ring, wherein contact with a particular one of the touch sensor segments selects the character located in the text entry segment that corresponds to the particular touch sensor segment.

In accordance with another aspect of the invention, the angular text entry segments are equal in their angular extent.

In accordance with another aspect of the invention, at least two one of the angular text entry segments differ in their angular extent.

In accordance with another aspect of the invention, those angular text entry segments having a greatest angular extent contain characters most likely to be selected by a user.

In accordance with another aspect of the invention, the angular extent of the angular text entry segments is rearranged after one or more of the plurality of characters is selected to increase the angular extent of those text entry segments that contain characters most likely to be subsequently selected.

In accordance with another aspect of the invention, the angular extent of the angular text entry systems are predetermined and fixed.

In accordance with another aspect of the invention, the angular extent of the angular text entry systems are dynamically adjustable based on prior user character selections.

In accordance with another aspect of the invention, the plurality of characters are arranged in a particular order on the graphical text entry ring and the order is rearranged after one or more of the plurality of characters is selected to position most likely next characters to be selected in positions close to the one or more selected characters.

In accordance with another aspect of the invention, the graphical text entry ring is depicted in its entirety on the graphical text entry screen.

In accordance with another aspect of the invention, only a portion of the graphical text entry ring is depicted on said graphical text entry screen.

In accordance with another aspect of the invention, the touch sensor ring is depicted in its entirety on the graphical text entry screen.

In accordance with another aspect of the invention, only a portion of the touch sensor ring is depicted on the graphical text entry screen.

In accordance with another aspect of the invention, a suggested text window is displayed adjacent to the graphical text entry ring after one or more characters are selected. The suggested text window includes at least one suggested character string corresponding to the one or more selected characters.

In accordance with another aspect of the invention, a plurality of graphical text entry rings is provided. The touch sensor ring is operable by a user to shuffle through the plurality of graphical text entry rings.

In accordance with another aspect of the invention, each of the plurality of graphical text entry rings contains a different set of characters.

In accordance with another aspect of the invention, the graphical text entry system is included in an electronic device.

In accordance with another aspect of the invention, upon being selected, the selected character is visually distinguishable from remaining unselected characters.

In accordance with another aspect of the invention, the selected character is visually distinguished by being highlighted.

In accordance with another aspect of the invention the selected character is visually distinguished by a change in color.

In accordance with another aspect of the invention, the selected character is visually distinguished by a change in font size or style.

In accordance with another aspect of the invention, the selected character is visually distinguished by a change in size.

In accordance with another aspect of the invention, upon being selected, the angular text entry segment associated with the selected character increases in size.

In accordance with another aspect of the invention, the graphical text ring and the touch sensor ring are located on different parts of the graphical text entry screen.

In accordance with another aspect of the invention, the graphical text ring and the touch sensor ring are superimposed on one another.

In accordance with another aspect of the invention, the electronic device is a portable electronic device.

In accordance with another aspect of the invention, the portable electric device is selected from the group consisting of telephones, cellular phones, PDAs, game controllers, remote controls, keyboards, and watches.

In accordance with another aspect of the invention, the touch sensor ring is selected from the group consisting of a resistive touchscreen, a thin dielectric layer capacitive touchscreen, a thick dielectric layer capacitive touchscreen, a surface acoustic wave touchscreen, an infrared touchscreen, and a force sensor touchscreen.

In accordance with another aspect of the invention, a method is provided for entering text into an electronic device. The method begins by displaying a graphical text entry ring on a graphical text entry screen and positioning a plurality of characters on the graphical text entry ring. A signal is generated in response to contact with a portion of the graphical text entry screen. The signal reflects a position on the graphical text entry screen at which the contact made. An individual character is selected from among the plurality of characters on the text entry ring based on the signal.

BRIEF DESCRIPTION OF THE DRAWINGS

For a more complete understanding of the invention, reference is made to the following description and accompanying drawings, in which.

DETAILED DESCRIPTION OF THE INVENTION

The present invention provides a user input for electronic devices such as portable or hand-held electronic devices. Such devices include, without limitation, telephones, cellular phones, PDAs, game controllers, remote controls, keyboards, watches or even devices in which electronics can be embedded such as eyeglasses.

Figure 1A:
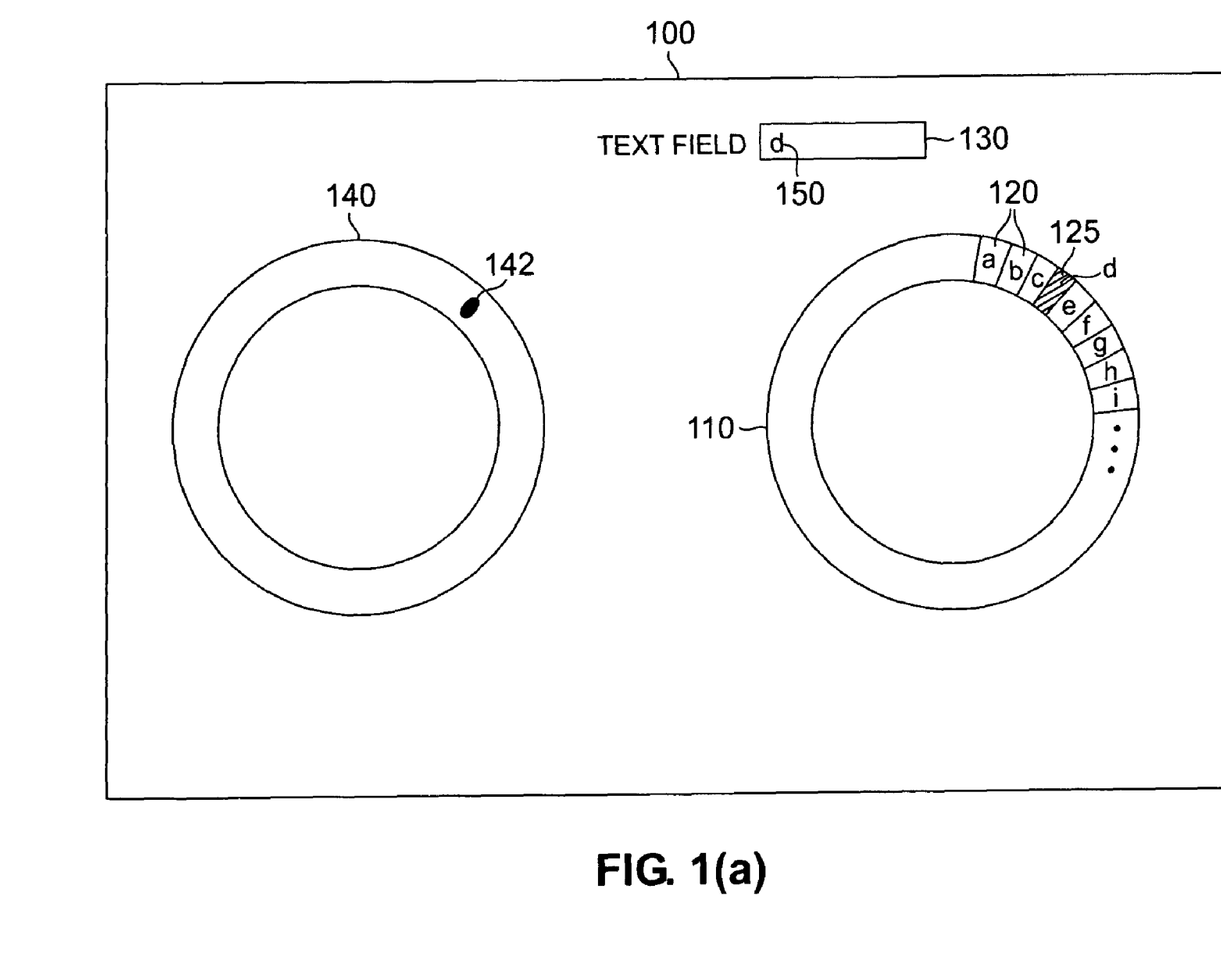
FIGS. 1(a)-1(e) are top plan views of various embodiments of a graphical text entry screen constructed in accordance with the invention that depict an entire text ring.
Figure 1B:
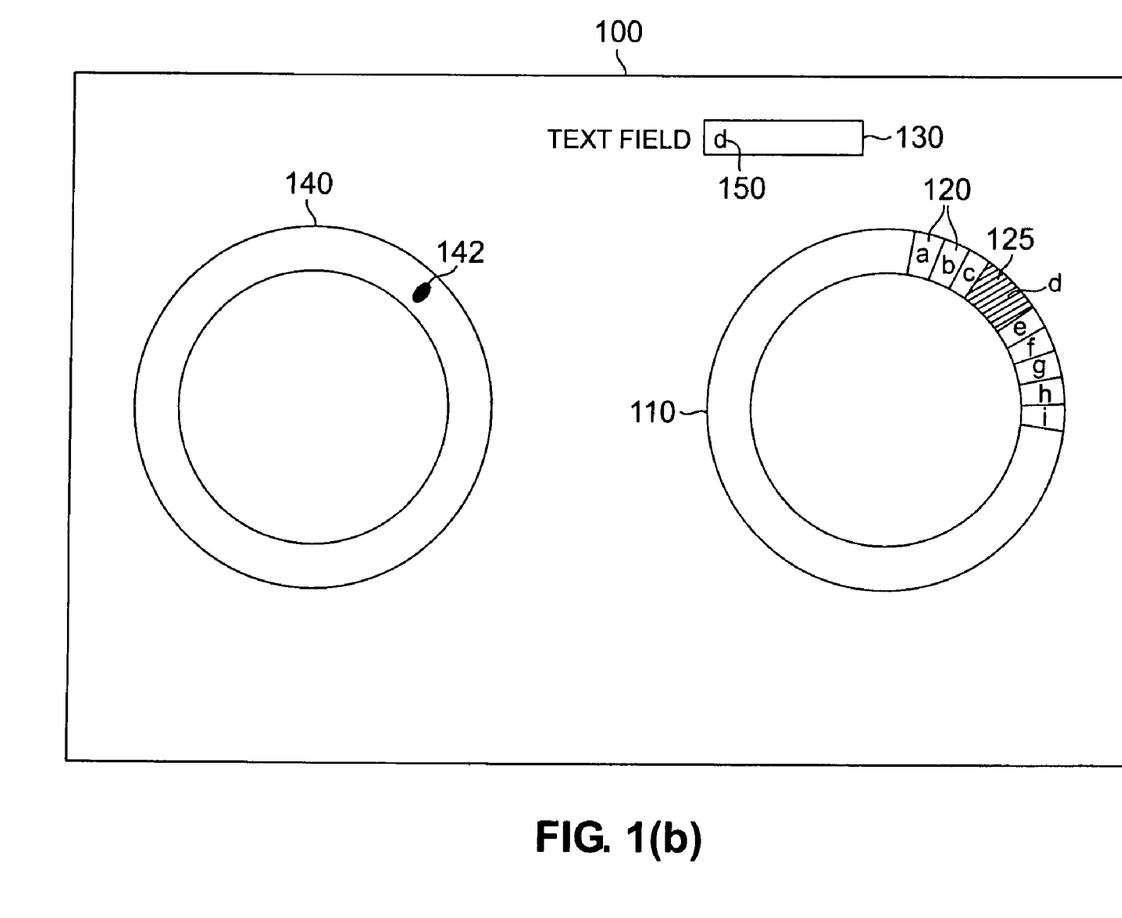
Figure 1C:
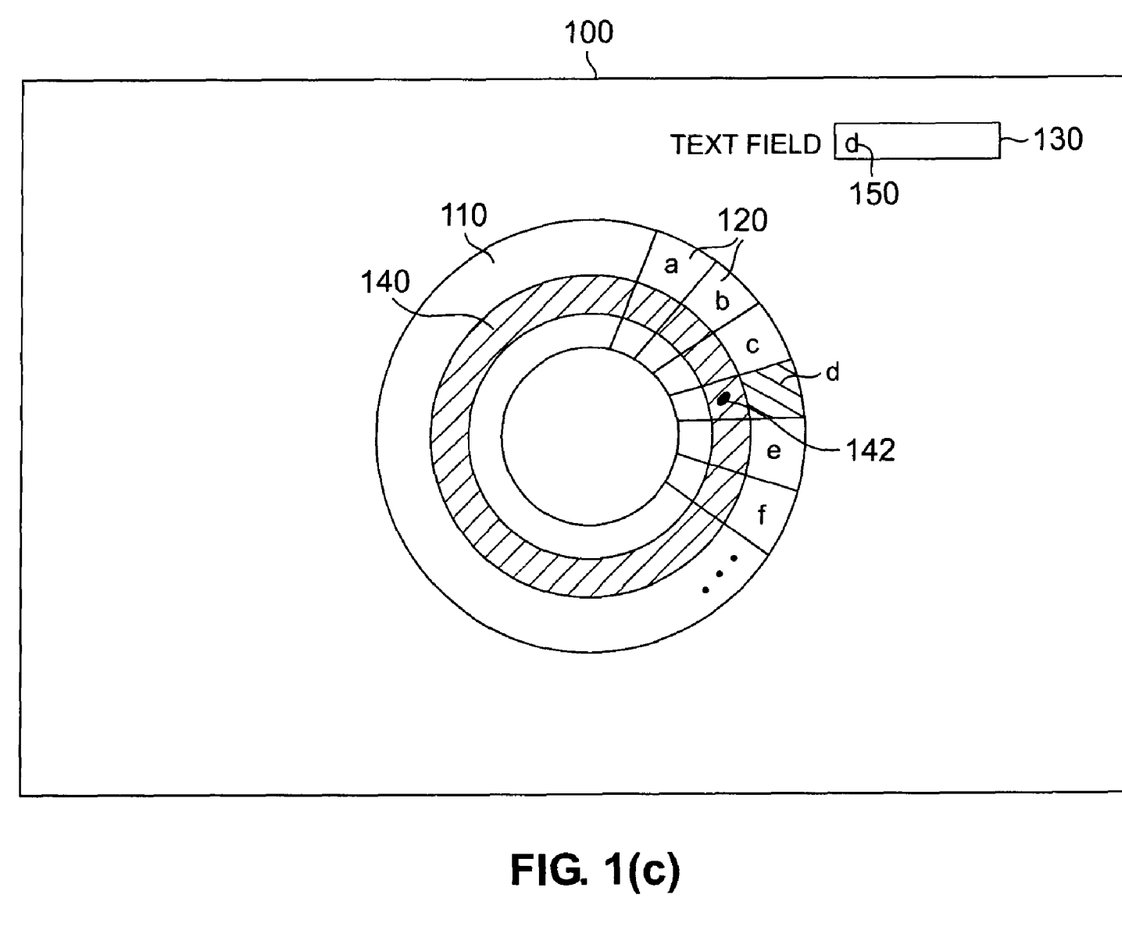
Figure 1D:
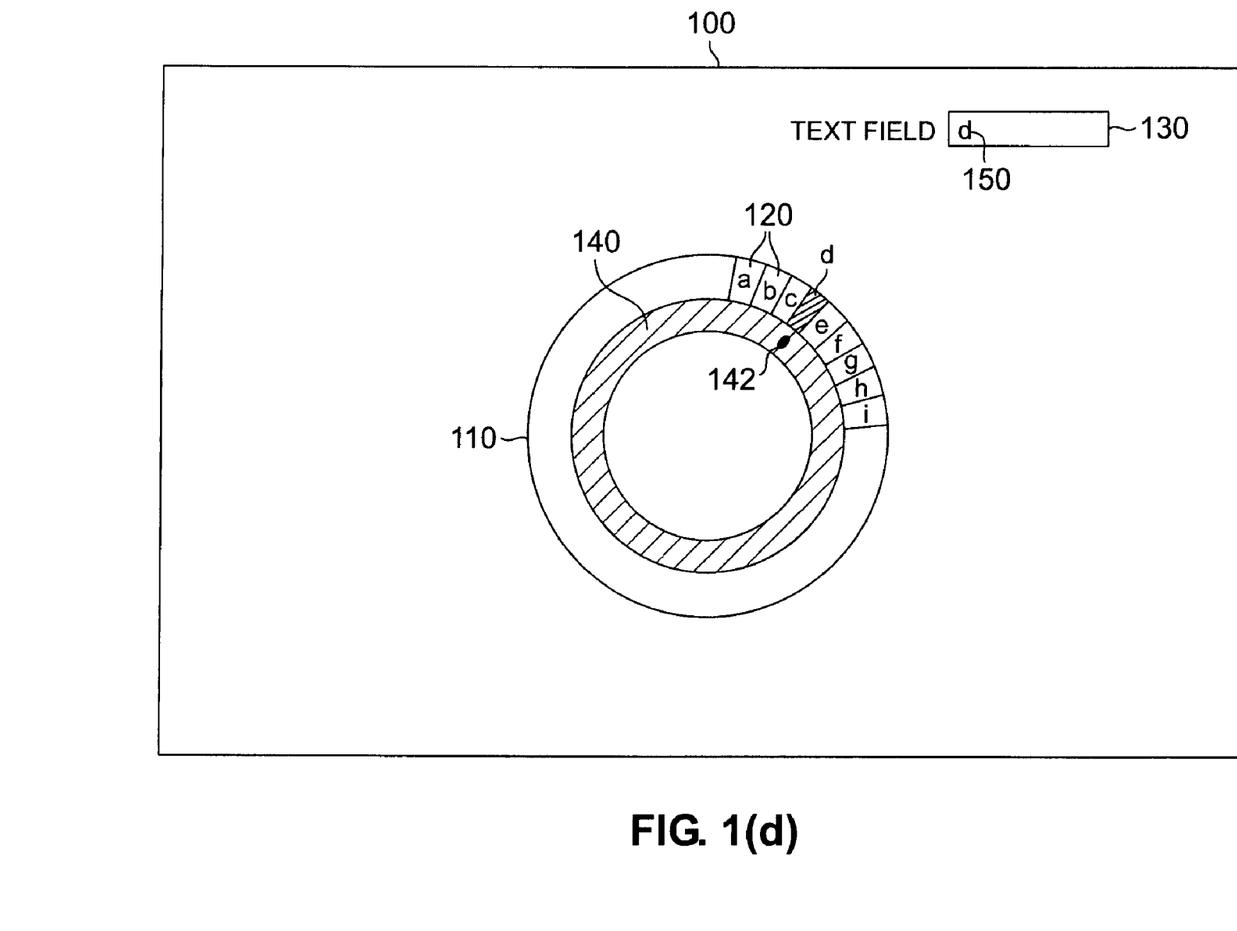
Figure 1E:
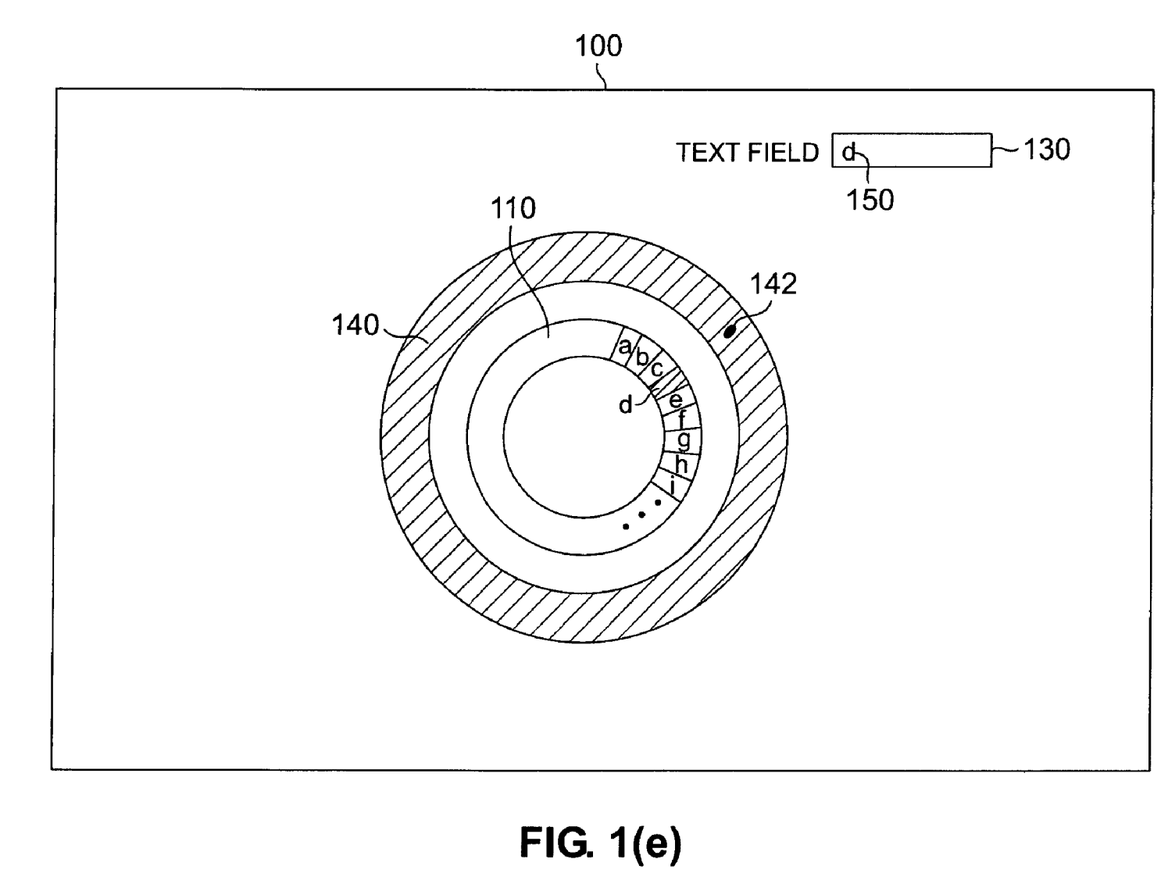

Referring first to FIG. 1(a), a graphical interface screen 100 constructed in accordance with the invention is depicted. Graphical interface screen 100 may be a CRT display screen, an LCD screen, or any other type of display screen. Currently, hand held electronic devices generally employ LCD screens. Within graphical interface screen 100 is displayed a graphical text entry ring 110 having a plurality of characters 120 positioned therein. A darkened or highlighted portion 125 of graphical text ring 110 depicts a selected character. The highlighted portion 125 may be distinguished from the unselected characters by a change in background or character color, font, font style or by a change in any other appropriate feature. Moreover, as shown in FIG. 1(b), the selected character, which typically remains visible after being selected, may automatically increase in size upon being selected to make it more prominent. Also shown on graphical text entry screen 100 is a text designation field 130 for recording the material entered into the graphical text entry system by a user, or to display additional information to the user. Upon selection of one of the plurality of the characters 120 by moving the darkened portion 125 thereon, this selected character is depicted within text designation field 130.

The characters 120 that are displayed may be letters, numbers, mathematic operators, or other symbols of any type. For purposes of illustration only and not as a limitation on the invention, the invention will be depicted in terms of the English-Roman alphabet.

The graphical interface screen 100 also displays a touch sensor ring 140 for use in selecting a particular character from the graphical text ring 110. Touch sensor ring 140 is a transparent input device that can be placed over, or integrated with, the graphical interface screen 100. The touch sensor ring 140 generates a signal related to the position of an actuator such as a finger or electronically passive stylus on the ring 140. By selecting a location on the touch sensor ring 140, the corresponding location on the graphical text ring 110 will be highlighted. That is, each angular segment along the graphical text ring 110 is associated with the same angular segment along the touch sensor ring 140 For example, as shown in FIGS. 1(a) and 1(b), by touching the highlighted portion or angular segment 142 of touch sensor ring 140, the character "d" will be highlighted on the graphical text ring 110. Moreover, in the embodiment of the invention shown in FIG. 1(b), the angular segment associated with the character "d" increases in size so that it is more prominent. The character that is highlighted may then be selected by removal of the actuator from the angular segment 142 of the touch sensor ring 140. If the highlighted character is not the character that the user wishes to select, the user may rotate the actuator clockwise or counter clockwise along the touch sensor ring 140 to navigate to another character along the graphical text ring 110. Thus, by positioning the actuator along the touch sensor ring 140 it is possible to arrive at any desired character within the current text entry ring, and thereafter to select this character by removal of the actuator. If a character is selected in error, the character may be deleted by once again using the actuator to contact the angular segment on the touch sensor ring 140 that corresponds to the erroneously selected character and maintaining contact for a predetermined extended period of time (e.g., 2 seconds). Other character selection and deletion actions (e.g., pressure sensing) may be chosen for the various embodiments.

In the embodiments of the invention shown in FIGS. 1(*a*) and 1(*b*), graphical text ring 110 and touch sensor ring 140 are located on different portions of the graphical interface screen 100. However, in other embodiments of the invention the rings 110 and 140 may be overlapping, or as shown in FIG. 1(*c*), superimposed on one another. In yet other embodiments of the invention the graphical text ring 110 and the touch sensor ring 140 may be concentric with one another. For instance, as shown in FIG. 1(*d*), touch sensor ring 140 may be located within graphical text ring 110, or, as shown in FIG. 1(*e*), graphical text ring 110 may be located within touch sensor ring 140.

Touch sensor ring 140 may employ any touchscreen technology that is desired and which is appropriate for any particular application. For example, touch sensor ring 140 may employ, without limitation, a resistive touchscreen, a thin dielectric layer capacitive touchscreen, a thick dielectric layer capacitive touchscreen, a surface acoustic wave touchscreen, an infrared touchscreen, and force sensor touchscreen.

In some embodiments of the invention, the arc length of the angular segments occupied by each character in the graphical text ring 110 is the same for each and every character. Alternatively, in other embodiments of the invention the arc length for two or more of the characters may differ from one another. In particular, it may be advantageous to increase the arc length for those characters that on a statistical basis are more likely to be selected than other characters. In this way the characters that are most likely to be selected will be more easily discernable to the user. Moreover, it also will be easier for the user to select these characters because the arc length of the corresponding segment on the touch sensor ring 140 will also be increased, thereby making it easier to contact the correct segment instead of inadvertently contacting an adjacent segment. For example, in FIG. 2 the arc length of the angular segments which are occupied by the characters "a" "e" and "i," respectively, are greater than the arc length of the angular segments occupied by other characters since these characters are most commonly employed in standard written English Of course, the particular characters that are chosen to have an increase or decrease in the length of their respective segments will be determined by the particular language that is employed (assuming, that is, that the character set is an alphabetic set).

Instead of increasing the arc length of the angular segments occupied by each character in the graphical text ring 110 in a predetermined, static manner as described above, the arc length may be varied in a dynamic manner. That is, the arc lengths may be altered by determining which characters are most likely to be subsequently chosen by the user based on the previously selected character or characters. Characters that are less likely to be chosen next on the graphical text ring 110 are placed in segments that have shorter arc lengths. The determination of those characters that are more and less likely to be selected may be performed by a processor and an electronic dictionary that both located in the hand held device.

In other embodiments of the invention the location of the characters with respect to one another along the graphical text ring 110 may be changed on a dynamic basis. That is, the character that the user is most likely to next chose may be positioned next to the character that the user has just selected. In this way less movement of the actuator is required by the user in finding the subsequent character after the selection of a previous character. After entry of the mode in which the characters are reorganized so that the most likely next characters are positioned adjacent the selected character, the user may reset the location of the characters so that they are back in their original sequence In some embodiments of the invention the user may be able to access a plurality of graphical text entry rings 110. Specifically, the user may shuffle through any number of text rings 110 which are maintained in memory. Access to the various text rings 110 may be achieved in any appropriate manner. For example, each text ring 110 may be provided with a dedicated character that when selected scrolls to the next available text ring 110. Alternatively, or in addition thereto, access to the text entry rings 110 may be achieved through the manipulation of a mouse, trackball, joystick or the like. After shuffling through all of the possible text rings and arriving at a desired text ring, it is then possible to manipulate the actuator as noted above with respect to the first text ring in order to rotate the current text ring to arrive at a desired character for selection. In this manner, the user may select one of any number of characters from any number of text rings, and still maintain single hand operation.

Figure 3:
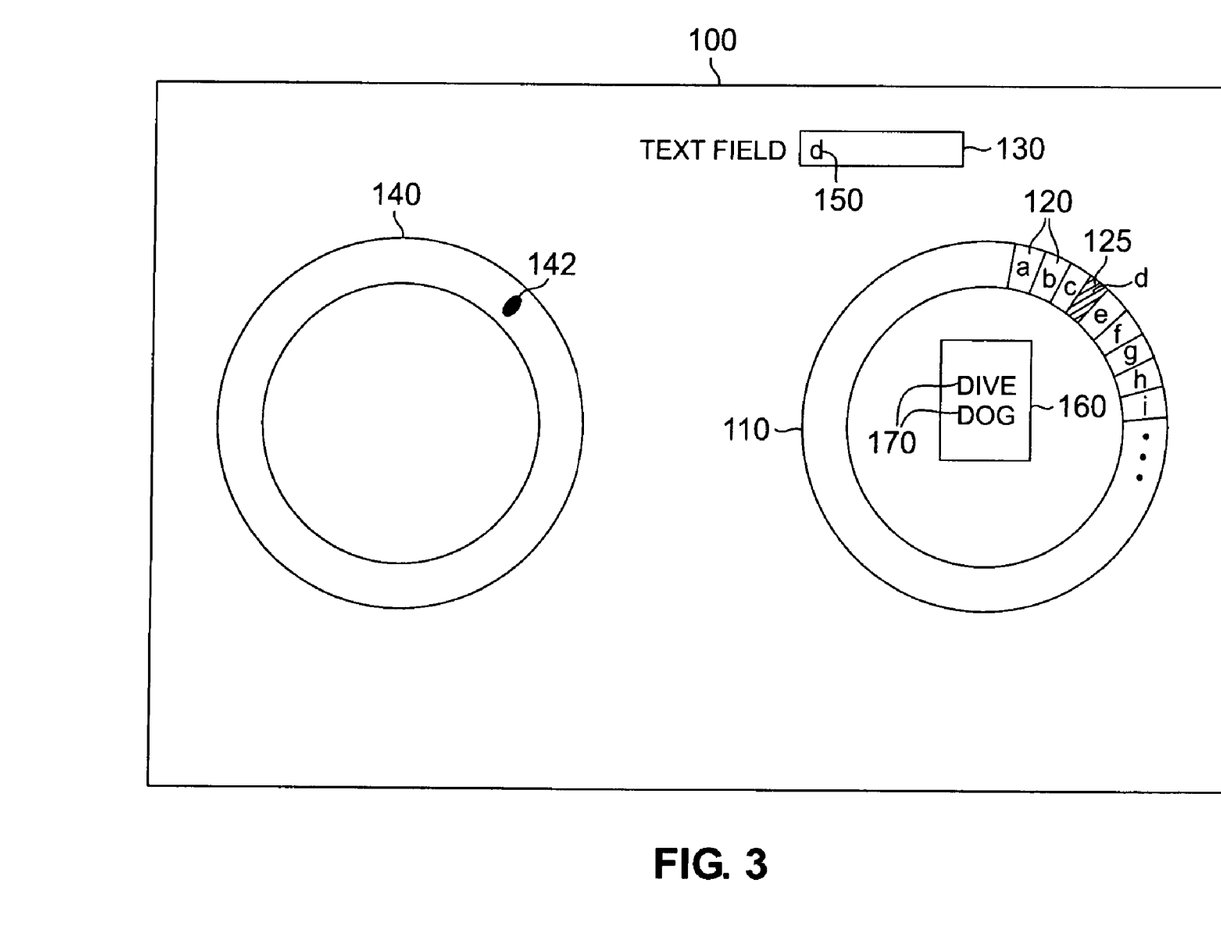
FIG. 3 is a top plan view of a graphical text entry screen constructed in accordance with the invention in which a selected letter generates suggested words.

In another embodiment of the invention, graphical text entry screen 100 provides a list of one or more suggested words which might be the word intended to be entered by the user. Thus, as is shown in FIG. 3, a suggested text window 160 is provided with at least one suggested character string or word 170. By way of example, upon the selection of the letter "d", a list of selected possible words 170 is displayed within suggested text window 160. Thus, as is shown, the word "dive" is shown as a potential word starting with the letter "d". In accordance with this embodiment of the invention, it is possible to provide any number of words, either generated from a dictionary provided by the apparatus, or a dictionary provided by the user, so that the user need not enter all the letters of the words, but can select a word from the list. While the list is shown using only a first selected character to produce suggested words, the user may enter a second selected character, thereby narrowing the range of possible words that could be intended by that user. Graphical text entry screen 100 utilizes these two first selected characters, and displays only potential words that began with these two selected characters. In this manner, graphical text entry by a user is performed more easily, and more quickly.

Figure 2:
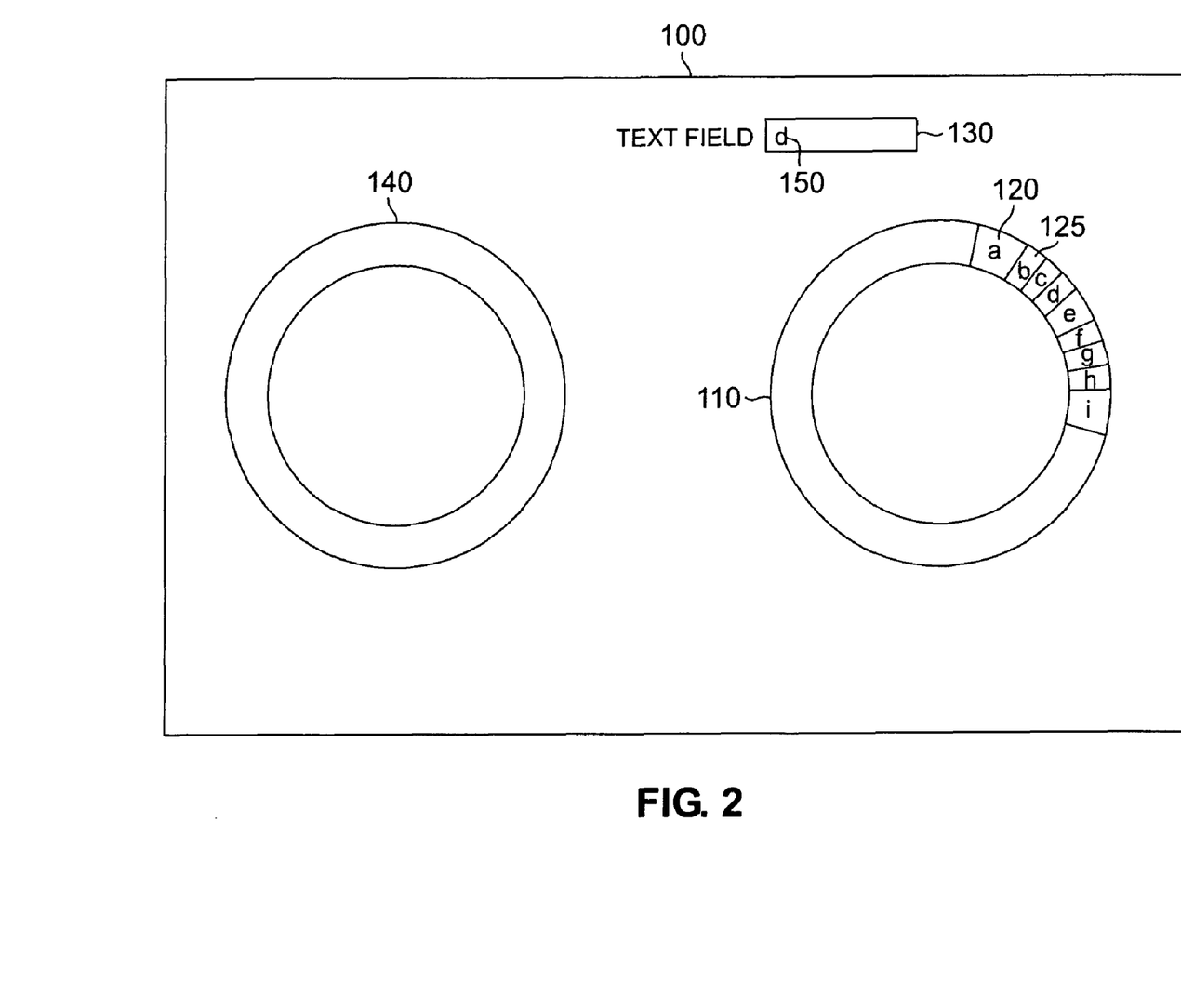
FIG. 2 is a top plan view of an alternative embodiment of a graphical text entry ring constructed in accordance with the invention.
Figure 4:
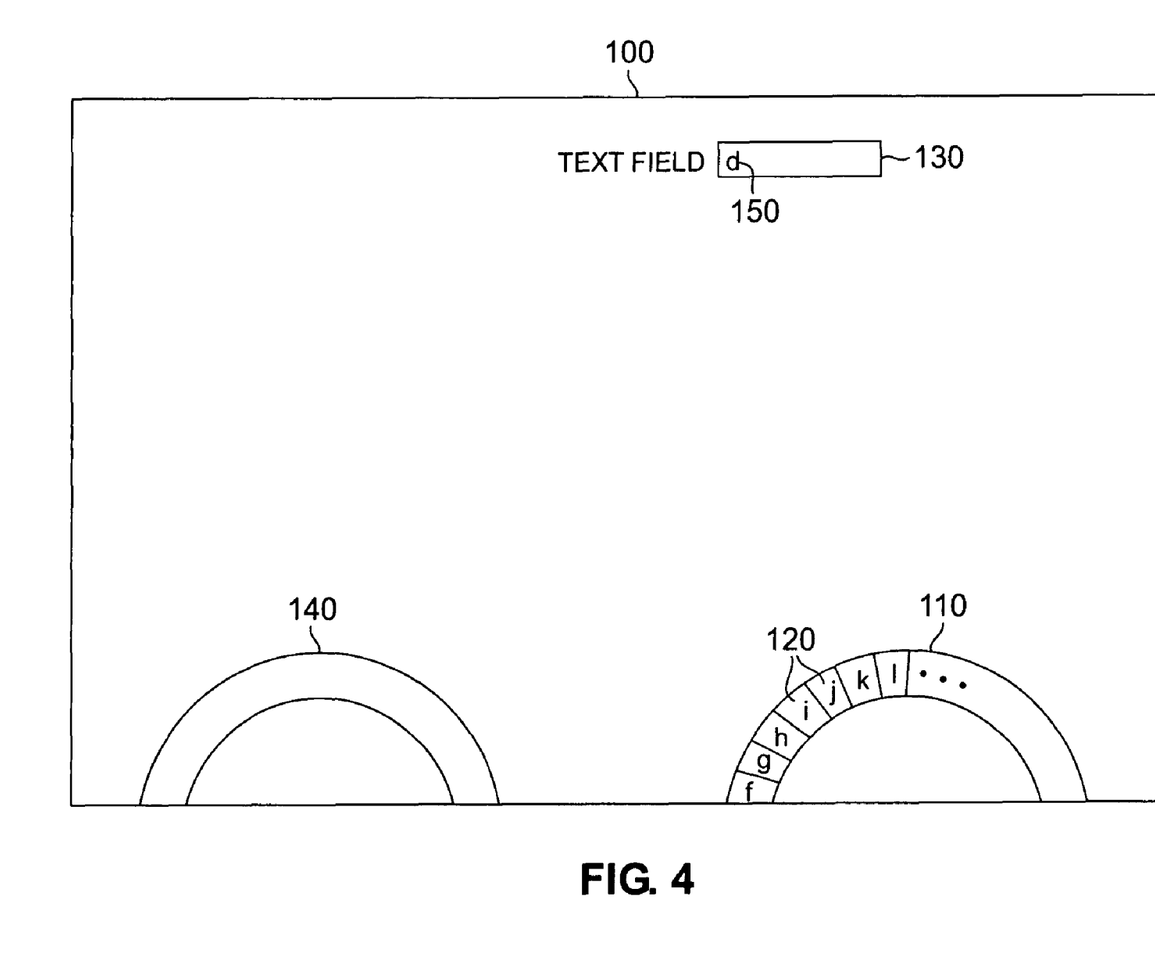
FIG. 4 is a top plan view of a graphical text entry screen constructed in accordance with the invention in which only a portion of the text ring and the touch sensor ring are depicted on the screen.

While text screen 100 in FIGS. 1-3 display the entire graphical text entry ring and touch sensor ring 140, these rings may take up a large portion of the screen, therefore not allowing for the display of much additional information. Thus, as is shown in FIG. 4, in accordance with some embodiment of the inventions, only a portion of the graphical text entry ring 110 and touch sensor ring 140 is displayed at any given time.

Although various embodiments are specifically illustrated and described herein, it will be appreciated that modifications and variations of the present Invention are covered by the above teachings and are within the purview of the appended claims without departing from the spirit and intended scope of the invention. For example, while the touch sensor and the characters are shown as being arranged in rings, they alternatively may be arranged in any desired configuration, including linear configurations. In addition, the touch sensor ring and the text entry ring may be located on different text entry screens or displays that may be incorporated in the same electronic device. For example, the electronic device may have a screen located on its front outer surface and its back outer surface. If the text entry screen is located on the front surface and the touch sensor ring is located on the back surface, the text entry screen can be easily observed by the user while the touch sensor ring is manipulated from behind.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

The invention claimed is:

1. A graphical text entry system, comprising:
 a graphical text entry screen;
 a graphical text entry ring displayed on said graphical text entry screen;
 a plurality of characters positioned on said graphical text entry ring, wherein said text entry ring has a plurality of angular text entry segments extending along its circumference in each of which one of said characters is located and said touch sensor ring has a plurality of angular touch sensor segments located along its circumference such that each of said touch sensor segments occupies an angular position along the touch sensor ring that corresponds to an angular position occupied by one of the text entry segments along the text entry ring, wherein contact with a particular one of the touch sensor segments selects the character located in the text entry segment that corresponds to said particular touch sensor segment; and
 a touch sensor ring located on said graphical text entry screen for selecting individual characters from among the plurality of characters on said text entry ring,
 wherein, upon being selected, the angular text entry segment associated with the selected character increases in size.

2. The graphical text entry system of claim 1 wherein said angular text entry segments are equal in their angular extent.

3. The graphical text entry system of claim 1 wherein at least two of said angular text entry segments differ in their angular extent.

4. The graphical text entry system of claim 3 wherein those angular text entry segments having a greatest angular extent contain characters most likely to be selected by a user.

5. The graphical text entry system of claim 3 wherein the angular extent of said angular text entry segments is rearranged after one or more of said plurality of characters is selected to increase the angular extent of those text entry segments that contain characters most likely to be subsequently selected.

6. The graphical text entry system of claim 3 wherein the angular extent of said angular text entry systems are predetermined and fixed.

7. The graphical text entry system of claim 3 wherein the angular extent of said angular text entry systems are dynamically adjustable based on prior user character selections.

8. The graphical text entry system of claim 1 wherein said plurality of characters are arranged in a particular order on said graphical text entry ring and said order is rearranged after one or more of said plurality of characters is selected to position most likely next characters to be selected in positions close to said one or more selected characters.

9. The system of claim 1, wherein said graphical text entry ring is depicted in its entirety on said graphical text entry screen.

10. The system of claim 1, wherein only a portion of said graphical text entry ring is depicted on said graphical text entry screen.

11. The system of claim 1, wherein said touch sensor ring is depicted in its entirety on said graphical text entry screen.

12. The system of claim 1, wherein only a portion of said touch sensor ring is depicted on said graphical text entry screen.

13. The system of claim 1, further comprising a suggested text window displayed adjacent said graphical text entry ring after one or more characters are selected, said suggested text window further comprising at least one suggested character string corresponding to said one or more selected characters.

14. The system of claim 1, further comprising a plurality of graphical text entry rings; and wherein said touch sensor ring is operable by a user to shuffle through said plurality of graphical text entry rings.

15. The system of claim 14, wherein each of said plurality of graphical text entry rings contains a different set of characters.

16. The system of claim 1, wherein said graphical text entry system is included in an electronic device.

17. The system of claim 1 wherein, upon being selected, the selected character is visually distinguishable from remaining unselected characters.

18. The system of claim 17 wherein the selected character is visually distinguished by being highlighted.

19. The system of claim 17 wherein the selected character is visually distinguished by a change in color.

20. The system of claim 17 wherein the selected character is visually distinguished by a change in font size or style.

21. The system of claim 17 wherein the selected character is visually distinguished by a change in size.

22. The system of claim 1 wherein the increase in size comprises an arc length of the segment.

23. The system of claim 1 wherein the increase in size comprises a radial dimension of the segment.

24. The system of claim 1 wherein the graphical text ring and the touch sensor ring are located on different parts of the graphical text entry screen.

25. The system of claim 1 wherein the graphical text ring and the touch sensor ring are superimposed on one another.

26. The system of claim 16 wherein said electronic device is a portable electronic device.

27. The system of claim 16 wherein said portable electric device is selected from the group consisting of telephones, cellular phones, PDAs, game controllers, remote controls, keyboards, and watches.

28. The system of claim 1 wherein said touch sensor ring is selected from the group consisting of a resistive touchscreen, a thin dielectric layer capacitive touchscreen, a thick dielectric layer capacitive touchscreen, a surface acoustic wave touchscreen, an infrared touchscreen, and a force sensor touchscreen.

29. A method for entering text into an electronic device, comprising the steps of:
 displaying a graphical text entry ring on a graphical text entry screen;
 positioning a plurality of characters on said graphical text entry ring, wherein said text entry ring has a plurality of angular text entry segments extending along its circumference in each of which one of said characters is located and said touch sensor ring has a plurality of angular touch sensor segments located along its circumference such that each of said touch sensor segments occupies an angular position along the touch sensor ring that corresponds to an angular position occupied by one of the text entry segments along the text entry ring, wherein contact with a particular one of the touch sensor segments selects the character located in the text entry segment that corresponds to said particular touch sensor segment;

generating a signal in response to contact with a portion of the graphical text entry screen, said signal reflecting a position on said graphical text entry screen at which said contact made; and selecting an individual character from among the plurality of characters on said text entry ring based on said signal, wherein upon being selected, the angular text entry segment associated with the selected character increases in size.

30. The method of claim 29 wherein the signal generating step comprises the step of generating the signal in response to contact with a portion of a touch sensor ring located on said graphical text entry screen.

31. The method of claim 29 wherein said angular text entry segments are equal in their angular extent.

32. The method of claim 29 wherein at least two one of said angular text entry segments differ in their angular extent.

33. The method of claim 32 wherein those angular text entry segments having a greatest angular extent contain characters most likely to be selected by a user.

34. The method of claim 32 wherein the angular extent of said angular text entry segments is rearranged after one or more of said plurality of characters is selected to increase the angular extent of those text entry segments that contain characters most likely to be subsequently selected.

35. The method of claim 32 wherein the angular extent of said angular text entry systems are predetermined and fixed.

36. The method of claim 32 wherein the angular extent of said angular text entry systems are dynamically adjustable based on prior user character selections.

37. The method of claim 29 wherein said plurality of characters are arranged in a particular order on said graphical text entry ring and said order is rearranged after one or more of said plurality of characters is selected to position most likely next characters to be selected in positions close to said one or more selected characters.

38. The method of claim 29, further comprising the step of displaying a suggested text window adjacent said graphical text entry ring after one or more characters are selected, said suggested text window further comprising at least one suggested character string corresponding to said one or more selected characters.

39. The method of claim 29, further comprising the step of providing a plurality of graphical text entry rings, each of said graphical text entry rings containing a different set of characters.

40. The method of claim 39, further comprising the step of generating a second signal in response to a second contact with a portion of the graphical text entry screen to display a different one of the plurality of graphical text entry rings.

41. The method of claim 29, wherein said graphical text entry ring is displayed in its entirety on said graphical text entry screen.

42. The method of claim 29, wherein only a portion of said graphical text entry ring is displayed on said graphical text entry screen.

43. The method of claim 29, wherein said electronic device is a hand held electronic device.

44. The system of claim 30, wherein said touch sensor ring is depicted in its entirety on said graphical text entry screen.

45. The system of claim 30, wherein only a portion of said touch sensor ring is depicted on said graphical text entry screen.

* * * * *